(12) United States Patent
Saxon et al.

(10) Patent No.: US 8,863,387 B2
(45) Date of Patent: Oct. 21, 2014

(54) SYSTEM FOR PLUGGING HEAT EXCHANGING TUBES

(75) Inventors: Gregory J. Saxon, Oakmont, PA (US); Mike Toth, Pittsburgh, PA (US); Jerry F. Hall, Oakmont, PA (US)

(73) Assignee: Conco Systems, Inc., Verona, PA (US)

( * ) Notice: Subject to any disclaimer, the term of this patent is extended or adjusted under 35 U.S.C. 154(b) by 382 days.

(21) Appl. No.: 13/359,086

(22) Filed: Jan. 26, 2012

(65) Prior Publication Data

US 2013/0192049 A1    Aug. 1, 2013

(51) Int. Cl.
  *B21D 39/08* (2006.01)
  *B21D 53/02* (2006.01)

(52) U.S. Cl.
  USPC .............. 29/890.044; 29/890.03; 29/890.035; 138/89; 138/96 R; 251/96

(58) Field of Classification Search
  USPC ........... 29/890.03, 890.035, 890.044; 138/89, 138/90, 92, 96 R; 137/351; 251/96
  See application file for complete search history.

(56) References Cited

U.S. PATENT DOCUMENTS

| 4,209,163 A * | 6/1980 | Nordskog | 251/96 |
| 4,393,564 A | 7/1983 | Martin | 29/157.3 |
| 4,425,943 A | 1/1984 | Martin | 138/89 |
| 4,436,117 A | 3/1984 | Martin | 138/89 |
| 4,982,763 A | 1/1991 | Klahn | |
| 5,437,310 A | 8/1995 | Cunningham | 138/89 |

FOREIGN PATENT DOCUMENTS

| JP | 61-11093 | 1/1986 |
| JP | 2-296094 | 12/1990 |
| JP | 6-35791 | 5/1994 |
| JP | 2005-256976 | 9/2005 |

OTHER PUBLICATIONS

Office Action in corresponding patent application in Japan, dated May 13, 2014.

\* cited by examiner

*Primary Examiner* — Richard Chang
(74) *Attorney, Agent, or Firm* — Kratz, Quintos & Hanson, LLP

(57) ABSTRACT

A system and a method for plugging a heat exchanger tube or the like. The system includes a plug member having a central shaft having a compressible member mounted on the central shaft such that axial compression of the compressible member radially expands the compressible member into sealing engagement with an inner wall of a tube in which the plug member is inserted. The system further includes a drive means removably engaged with the plug member for inserting the plug member into the tube and for providing axial force on the compressible member to cause radial expansion of the compressible member into sealing engagement with the inner wall of the tube.

13 Claims, 9 Drawing Sheets

SYSTEM FOR PLUGGING HEAT EXCHANGING TUBES

BACKGROUND OF THE INVENTION

In heat exchangers having a plurality of heat exchanging tubes, it is often necessary to plug ends of a tube in order to isolate the tube from the remaining tubes of the heat exchanger. By doing so, a heat exchanger having a damaged tube can continue to operate, although with a reduced efficiency, until replacement or repair of the tube can be carried out. In view of the fact that replacement or repair of the one, or more tubes, usually requires extensive down-time for the heat exchanger and equipment dependent on it, a plurality of tubes can be plugged, over a period of time, in order to continue operation of the equipment. Replacement or repair of the damaged tubes can then be carried out at a planned shutdown of the equipment, for example. When plugging a tube, it is advantageous to use a plug and a means for installing the plug, which can allow plugging of the tube in an effective manner and in a minimum amount of time.

U.S. Pat. No. 5,437,310 teaches a plug for plugging a tube of a heat exchanger, in which a tapered wedge is used to expand a compressive ring into contact with an inner wall of the tube. A breakaway means is included with the plug in order to control the force exerted in a radial direction of the plug when it is installed. Removal of the plug is difficult.

The present invention provides a highly effective plug member for a heat exchanger tube and a drive means for installing and removing the plug member. The drive means automatically positions the plug member at a selected depth in the tube and automatically controls the pressure holding and sealing the plug member against an inner wall of the tube. Use of the system of the invention is easily carried out with one operator without a great deal of physical exertion required. The drive means can also be used for removing a plug member that has previously been installed. With use of the present system, a plug member can be installed in a matter of a few seconds. This feature can be very important when working in the area of a damaged nuclear reactor, for example, where minimizing exposure to radioactive material in a heat exchanger is important.

SUMMARY OF THE INVENTION

The present invention is a system for plugging a heat exchanger tube or the like. The system includes a plug member having a central shaft having a compressible member mounted on the central shaft such that axial compression of the compressible member radially expands the compressible member into sealing engagement with an inner wall of a tube in which the plug member is inserted. The system further includes a drive means removably engaged with the plug member for inserting the plug member into the tube and for providing axial force on the compressible member to cause radial expansion of the compressible member into sealing engagement with the inner wall of the tube.

In another embodiment of the invention, the central shaft of the plug member has mounted thereon a pressing member abutting the compressible member, and the drive means moves the pressing member axially against the compressible member of the plug member, such that compressive force on the plug member is retained when the drive means is disengaged.

In another embodiment of the invention, the central shaft has a threaded portion extending beyond the pressing member and a nut mounted on the threaded portion for removable engagement with the drive means.

In another embodiment of the invention the drive means includes means for preventing rotation of the central shaft and means for rotating the nut.

In another embodiment of the invention the drive means includes a stop for controlling the depth the plug member is installed in the tube.

In still another embodiment of the invention the drive means includes a driver shaft for connecting to a power device for rotating components of the drive means.

The present invention also includes a method for plugging a heat exchanger tube or the like. The method includes providing a plug member having a central shaft having a compressible member mounted on the central shaft such that axial compression of the compressible member radially expands the compressible member into sealing engagement with an inner wall of a tube in which the plug member is inserted, providing a drive means removably engaged with the plug member for installing the plug member into the tube and for providing axial force on the compressible member to cause radial expansion of the compressible member into sealing engagement with the inner wall of the tube, inserting the plug member into the tube to be plugged, rotating a driver pulley of the drive means to a selected torque value to provide the axial force on the compressible member, and disengaging the drive means from the plug member.

BRIEF DESCRIPTION OF THE DRAWINGS

The invention will become more readily apparent by reference to the following description of a preferred embodiment, by way of example only, in the accompanying drawings, wherein.

DETAILED DESCRIPTION

The present invention is a system for plugging a heat exchanging tube. The system includes both a plug member for plugging the tube and a drive means for installing the plug member in the tube.

Figure 1:
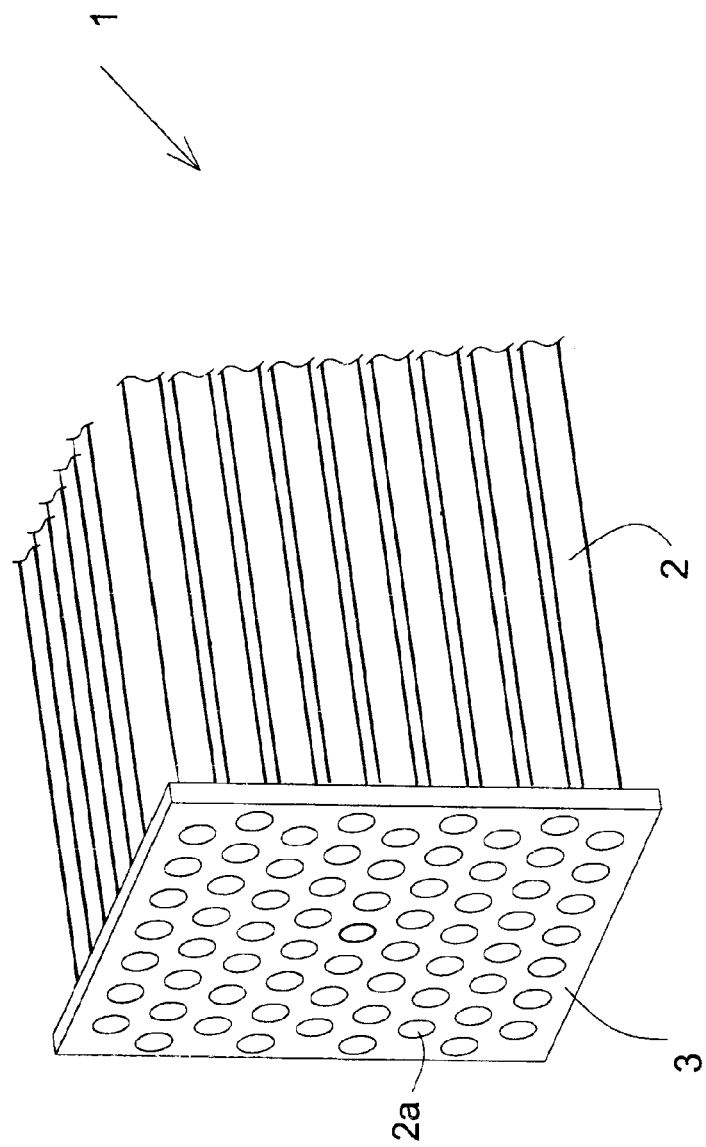
FIG. 1 is a perspective view of a section of a heat exchanger having a plurality of heat exchanging tubes disposed on a tube sheet of the heat exchanger.

FIG. 1 shows, in part, a typical heat exchanger 1, having a plurality of tubes 2 disposed in a tube sheet 3. A plug member of the invention can be used to plug ends of a tube, if the tube becomes damaged, thus allowing continued use of the heat exchanger and related equipment. It is typical in equipment having a heat exchanger to provide access to both ends of the tubes, in order to facilitate plugging of a damaged tube, or eventual repair or replacement of the damaged tube. In addition to plugging a damaged tube, the present invention can also be used to plug a tube that may not be damaged. For example, it may be necessary to isolate certain tubes in a heat exchanging system, for safety or other reasons. Although access to both ends of the tubes is usually possible, the system of the invention provides for plugging both ends of a tube by accessing only one end of the tube.

Figure 2:
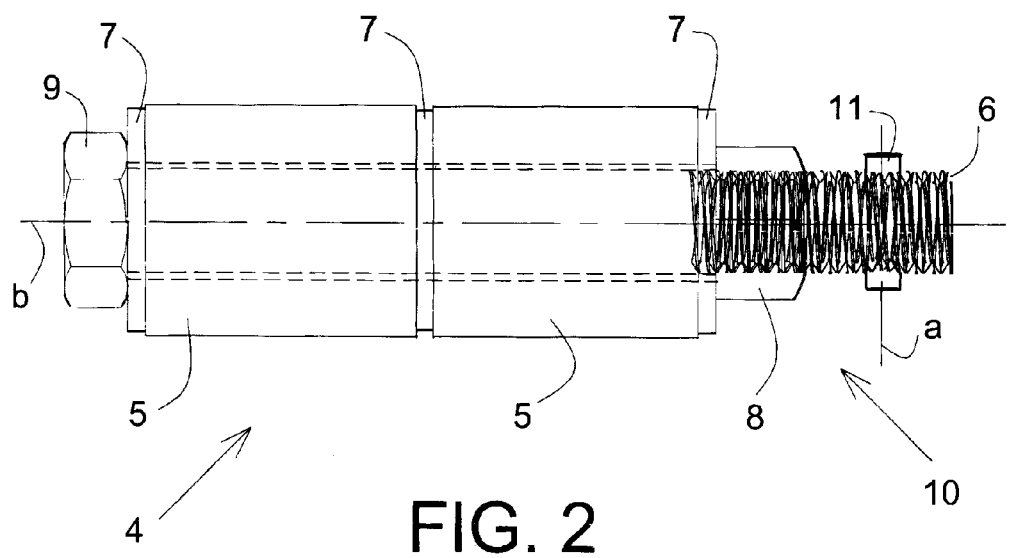
FIG. 2 is a side view of a plug member of the invention.

FIG. 2 is a side view of a plug member 4 of the invention. The plug member includes two compressible members 5 which are disposed on a central shaft 6. Although FIG. 2 shows two compressible members 5, practice of the invention can be carried out with a plug member having one, or more than two compressible members. The plug member further includes pressing members 7 and nut 8. The pressing members 7 are similar to steel or brass flat washers. The compressible members 5 and the pressing members 7 are disposed on the central shaft 6, as shown in FIG. 2, and nut 8 is threaded onto the central shaft to retain them in position. Central shaft 6 has a head 9 at one end, and threads 10 at the other end. The threads extend from the end opposite the head 9, to a location beyond the beginning of the compressible member 5 which is closest to the nut. Although a hexagonal head 9 is shown in FIG. 2, any head that would retain a pressing member 7 on the central shaft 6 is workable.

The central shaft 6 still further includes a pin 11, which extends through the thread portion 10 of the central shaft, with the central axis a of the pin 11 preferably intersecting the central axis b of the central shaft 6 at a 90 degree angle. The pin 11 preferably extends axially outward, on both ends thereof, beyond the threaded portion 10 of the central shaft 6, as shown in FIG. 2, and can be a pin cut from a metal rod, a spring pin, or the like. The pin and its function is discussed further in the description of the drive means for installing the plug member, found below.

It is preferred that the material of the central shaft, nut, pin and pressing members substantially match the material of the tube being plugged. Materials of the central shaft, nut, pin and pressing member include, but are not limited to, brass, stainless steel, carbon steel, titanium and silicon bronze. Such materials help to reduce or prevent corrosion of the components of the plug member and the tube by electrolysis due to dissimilar metals. For example, if the tubes of a heat exchanger are fabricated of brass, the central shaft, nut, pin and pressing members of the plug member are preferably fabricated of brass.

The compressible members 5 are of a material such as rubber or an elastomer, preferably neoprene polychloroprene, as manufactured by Dupont Performance L.L.C. Wilmington, Del. 19809. The material of the compressible member expands in a radial direction when its axial length is reduced. Preferably the compressible member 5 is of a cylindrical shape with a center bore having a diameter slightly larger than the diameter of the central shaft 6 or a diameter matched to the diameter of the central shaft. An outer diameter of the compressible member is selected to be slightly less than the inner diameter of the tube in which it is to be installed. A clearance of about 10-100 thousandths of an inch is preferred between the compressible member and the inner wall of the tube. Also, the pressing members 7 are selected to have an inner diameter slightly larger than the diameter of the central shaft 6, and an outer diameter substantially corresponding to the outer diameter of the compressible member 5, prior to the compressible member being compressed axially and expanded radially.

In plugging a tube 2 with the plug member 4, it is necessary to install the plug member in the tube to a desired depth, then tighten nut 8 against pressing member 7, while restraining central shaft 6 from rotating about its central axis b. As nut 8 is tightened, the compressible members 5 increase in diameter so as to exert pressure against the inner wall of the tube being plugged. It is preferred to tighten the nut to a selected torque in order that a complete seal is obtained between the compressible member and the inner wall, without rupturing the wall by applying too much pressure against it.

In order that fluid does not pass by any portion of the plug member, it is also necessary to have the diameter of the central bore of the compressible member 5, in relation to the diameter of the central shaft 6, as discussed above, so that decreasing the axial length of the compressible member also creates a seal between the compressible member 5 and the central shaft 6. Also, to improve the effectiveness of the seal, the threaded portion 10 should not extend along the central shaft 6 any further than is necessary to obtain the shortened axial length that is necessary for sealing the compressible member against the tube and against the central shaft, as it is easier to seal the compressible member against the smooth surface of the central shaft than against the threaded surface.

Figure 3:
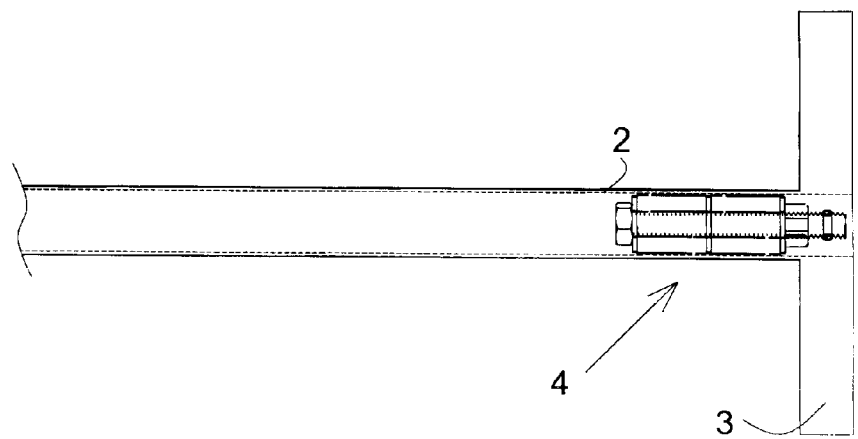
FIG. 3 is a side view of the plug member of the invention installed in a tube of a heat exchanger.

The amount of torque applied to the nut 8 is determined by consideration of the pressure at which the heat exchanger is operated, the material of the compressible member, the combined length of all of the compressible members, the inner diameter of the tube, and the diameter and thread pitch of the central shaft 6. Proper installation of the plug member is dependent on applying the correct torque to nut 8 while restraining central shaft 6 from rotating about its central axis b. Preferable values for the applied torque are in a range of 20 to 60 inch-pounds. FIG. 3 shows plug member 4 installed in heat exchanger tube 2.

Many prior art radially expanding plugs are limited to a one-time use as the radial expansion of the material of the plug is not reversible when the axial force on the material is removed. However, with the material of the present invention, the plug can ordinarily be re-used a number of times.

As mentioned above the system of the invention includes both the plug member 4 and a drive means for installing the plug member. FIGS. 4-10 are referred to for disclosing a drive means 12 of the invention.

Figure 4:
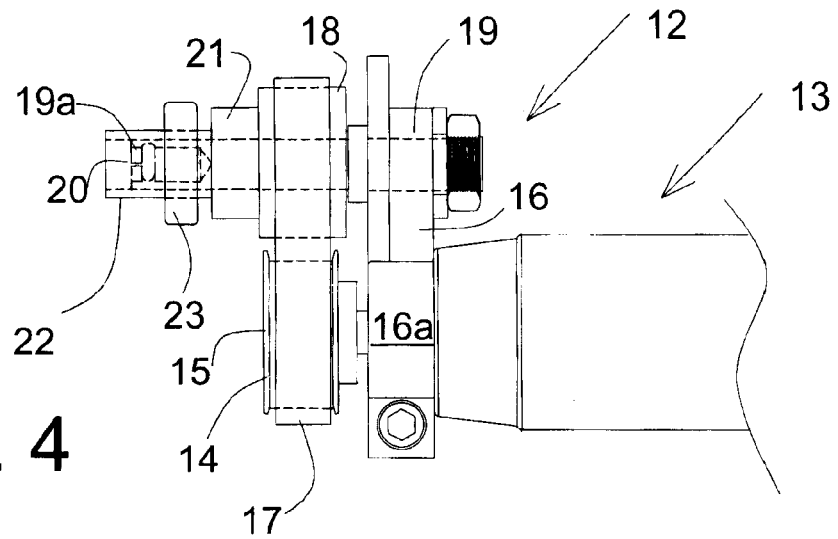
FIG. 4 is a side view of the drive means of the invention engaged with a portable electric drill.

FIG. 4 shows drive means 12 and a portable electric drill 13, which can be used to rotate components of the drive means. The portable electric drill is preferably of the type incorporating a torque control feature, in order that torque applied to the drive means 12, and in turn torque applied to nut 8 on the central shaft 6, can be controlled. Although a portable electric drill is mentioned throughout the specification, an electric drill requiring line voltage, and having torque control, can also be used, as well as an air powered drill or a hand operated tool. If an air powered drill is used, one having a means for controlling the torque, such as by controlling the pressure at which it is operated, is preferred. If a hand operated tool is used, use of a torque wrench with the hand operated tool is preferred.

During installation of a plug member, the drill 13 rotates a driver pulley 14 fixedly mounted on driver shaft 15, and is free to rotate in an opening in mounting plate 16. The driver pulley 14 is preferably of the type having cogs to accommodate a timing belt 17, likewise having cogs. In a preferred embodiment, an end of the driver shaft 15, opposite the end to which the driver pulley is mounted, is machined to be accommodated on a shaft of the drill head on which a chuck of the drill is normally mounted.

In addition to having the driver shaft 15 installed on the shaft of the drill that rotates, that is the drill shaft where the chuck is normally mounted, it is also necessary that the mounting plate 16 be locked to a portion of the drill head that does not rotate. This is accomplished with use a mounting clamp 16a which is a part of mounting plate 16. The locking of the mounting plate 16 to the drill 13 is facilitated when a drill such as a DeWALT model DCD980, manufactured by DeWALT Industrial Tool Co. Baltimore, Md. 21286 is used, as it has a drill head that includes a portion for clamping an extension handle, normally used in operation of the drill. When the extension handle is removed, the mounting plate 16 can easily be clamped to a cylindrically shaped surface at the location provide on the drill head for the extension handle. In the drill mentioned above, the drill shaft for accommodating the chuck or the driver shaft 15 includes external left-handed threads and a small cavity at the central axis of the drill shaft having right-handed threads for accommodating a small right-handed screw. The combination of the left-handed and right-handed threads helps prevent the driver shaft 15 from loosening on the drill shaft during use. Although the above-described drill, mounting plate and central shaft which is machined to be installed on the drill shaft of the drill normally used for a chuck, a drill having a conventional chuck installed can also be used. When a conventional chuck is used, the driver shaft 15 is fabricated to be rod shaped, in order to be engaged in the chuck as a drill bit would be engaged, for example. Also, when a conventional chuck is utilized a means must additionally be provided for securing the mounting plate 16 to the drill body, in order that the mounting plate does not rotate during installation of the plug member. In practice of the invention, any means to secure the mounting plate to the drill body is possible.

As mentioned above, a driver pulley and timing belt having cogs is preferred in order to transfer the torque from the drill 13 to the nut 8 without any loss of torque due to slippage of the timing belt 17 on the pulleys. The timing belt 17, driven by driver pulley 14, in turn, drives driven pulley 18, also having cogs, which is rotationally mounted on a stationary shaft 19. As shown in FIG. 4, stationary shaft 19 is fixedly mounted in mounting plate 16 so as not to rotate in the mounting plate. Stationary shaft 19 extends to an end 19a which includes a slot 20, which accommodates pin 11 of the plug member 4, discussed above.

Figure 5:
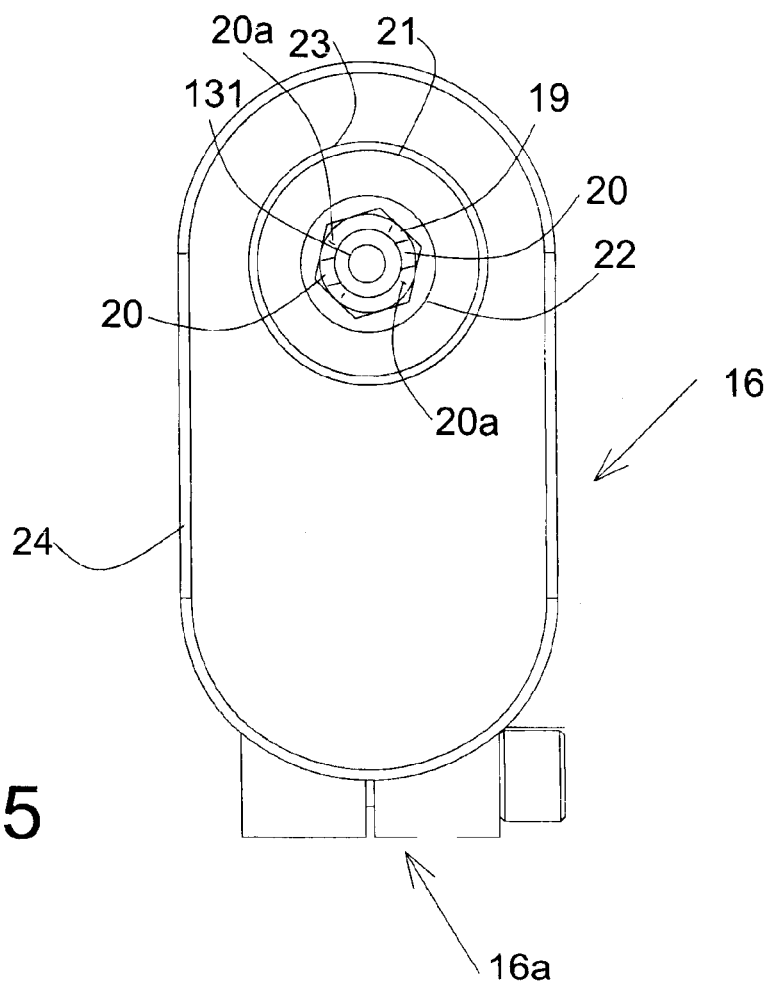
FIG. 5 is a partial front end view of the system of the invention showing the portion of the drive means for receiving the plug member.

Driven pulley 18 has fixedly attached thereto hub 21 and socket 22. Socket 22 is arranged to accommodate nut 8 of the plug member 4, discussed above. Also, fixedly attached to the outer wall of socket 22 is stop 23, which is selected to have a diameter greater than the inner diameter of the tube of the heat exchanger being plugged. FIG. 5, a front view of a portion of the drive means, shows the relationship of the socket 22, stationary shaft 19 having slots 20, stop 23, hub 21 and mounting plate 16. In operation of the drive means socket 22 rotates while stationary shaft 19 does not rotate. Lines 20a indicate a portion of each slot 20 that extends circumferentially from the bottom of axially extending portions of slots 20. The slots are sometimes referred to as bayonet lock type slots.

In operation of the drive means 12, when drill 13 rotates driver pulley 14, driven pulley 18 rotates due to timing belt 17 connecting the two pulleys. When driven pulley 18 rotates, hub 21, socket 22 and stop 23 also rotate. However, stationary shaft 19, having slots 20, does not rotate, because of its fixed attachment to mounting plate 16. Regarding the pulleys, driver pulley 14 and driven pulley 18 are preferably of the same diameter, but dissimilar diameters can be used, as the torque output to socket 22, which would vary for different relative sizes of pulleys, can easily be controlled by adjusting the torque input to the drive means 12 from drill 13.

Preferably, a guard 24, as shown in FIG. 5, is provided to enclose the pulleys and timing belt in order to protect the operator during use of the drive means.

Figure 6:
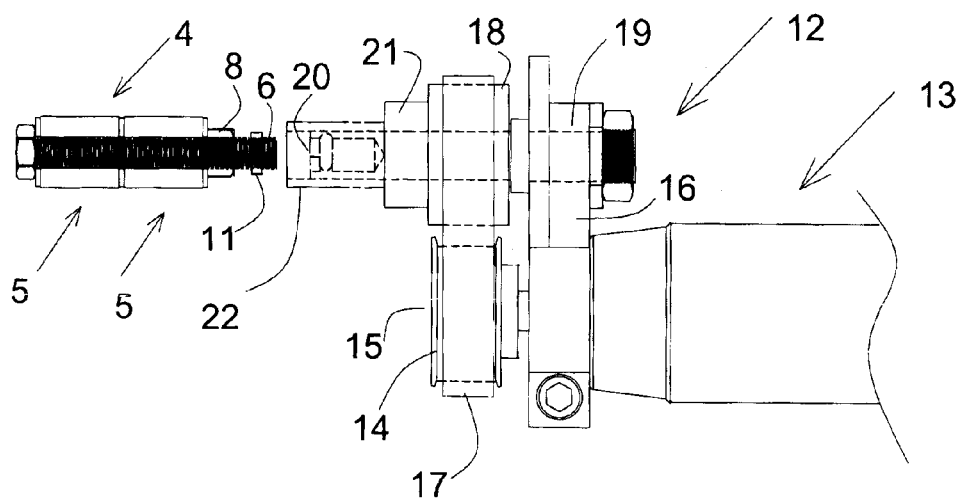
FIG. 6 is a side view of the drive means and plug member of the invention, prior to loading the plug member into the drive means.
Figure 7:
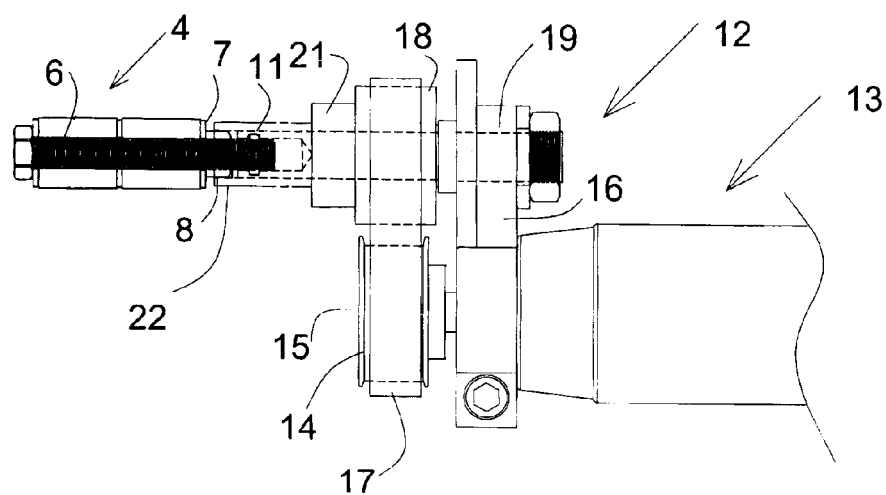
FIG. 7 is a side view of the drive means of the invention having the plug member of the invention in a loaded condition, prior to inserting the plug member into a tube of a heat exchanger.

FIGS. 6 and 7 show the operation of loading plug member 4 into drive means 12. As shown in FIG. 6, plug member 4 is rotated to align pin 11 with slots 20. Slots 20 are best viewed in FIG. 5. Then, as shown in FIG. 7, plug member 4 is moved axially to enable pin 11 of central shaft 6 to enter the axially extending slots 20 and nut 8 to enter socket 22. The plug member 4 is moved axially until the pin 11 reaches the bottom end of the axially extending portion of slot 20. Following this step, the plug member 4 is rotated a few degrees in order to seat pin 11 in the portions 20a of slots 20, which extend circumferentially from the bottoms of the axially extending slots, to hold the plug member in the drive means. With the plug member 4 held in the drive means 12, an operator can easily position the plug member in the tube of the heat exchanger for the installation step.

In FIGS. 6 and 7, the stop 23, discussed in relation to FIG. 4 is not shown, in order to be able to clearly show portions of the socket and central shaft that would be hidden by the stop. The stop 23 is shown in FIGS. 8-10.

Figure 8:
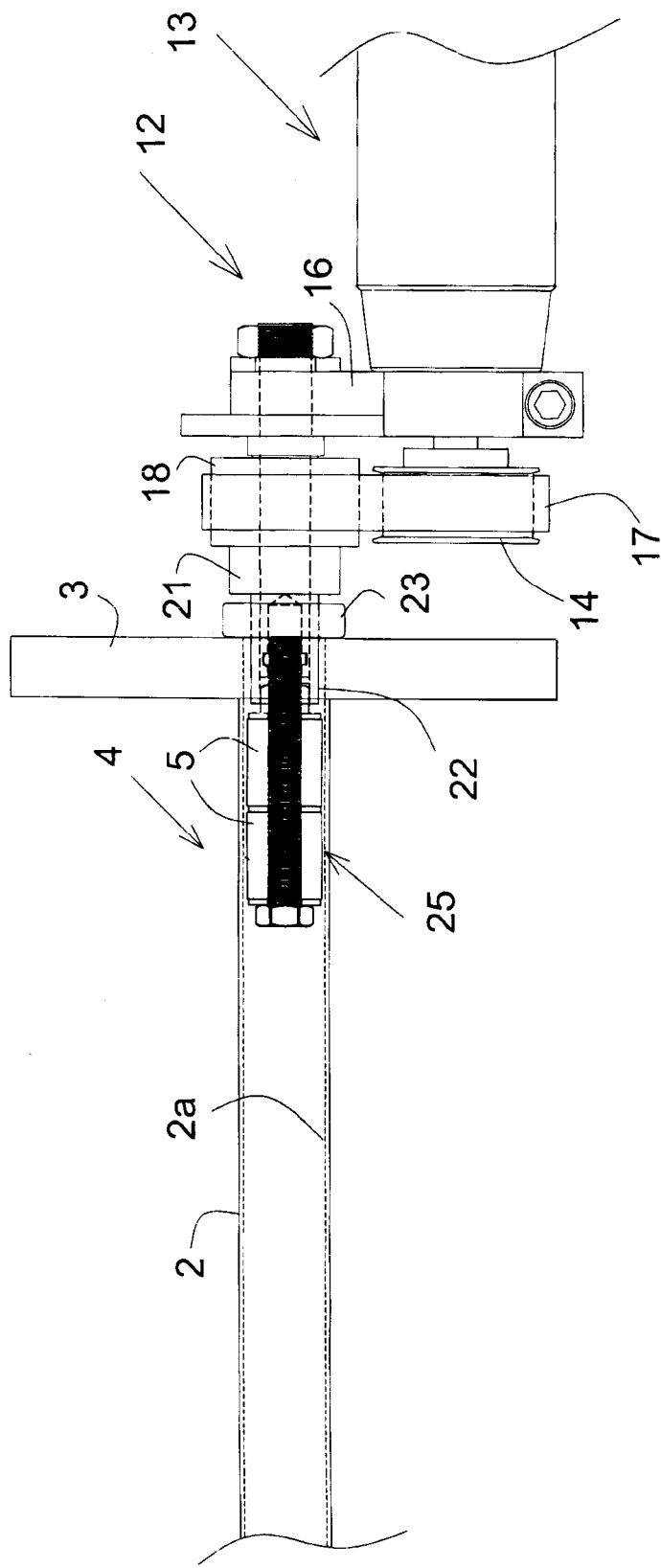
FIG. 8 is a side view of the drive means of the invention, having the plug member of the invention in a loaded condition, and having the plug member inserted into a tube of a heat exchanger, prior to the expansion of the plug member.
Figure 9:
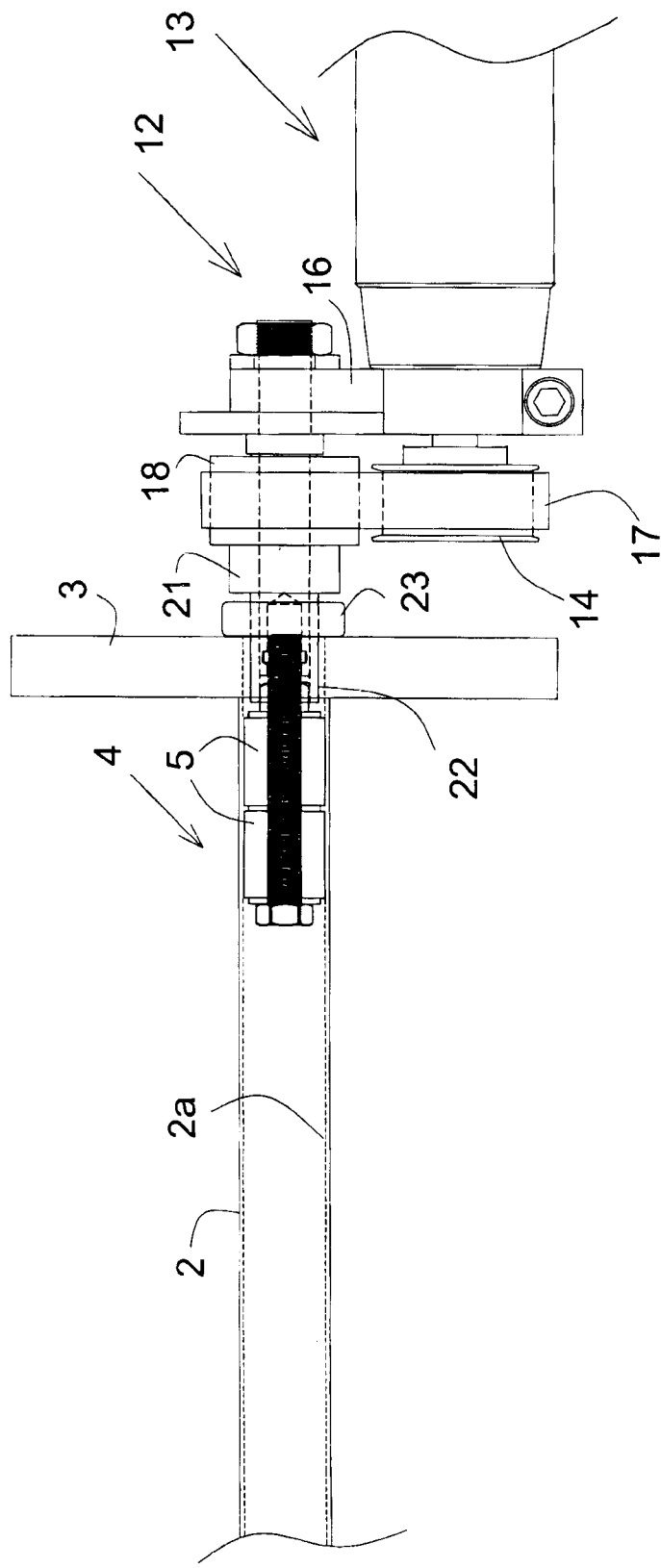
FIG. 9 is a side view of the drive means of the invention, having the plug member of the invention in a loaded condition, with the plug member being in the expanded condition against the inner wall of the tube.
Figure 10:
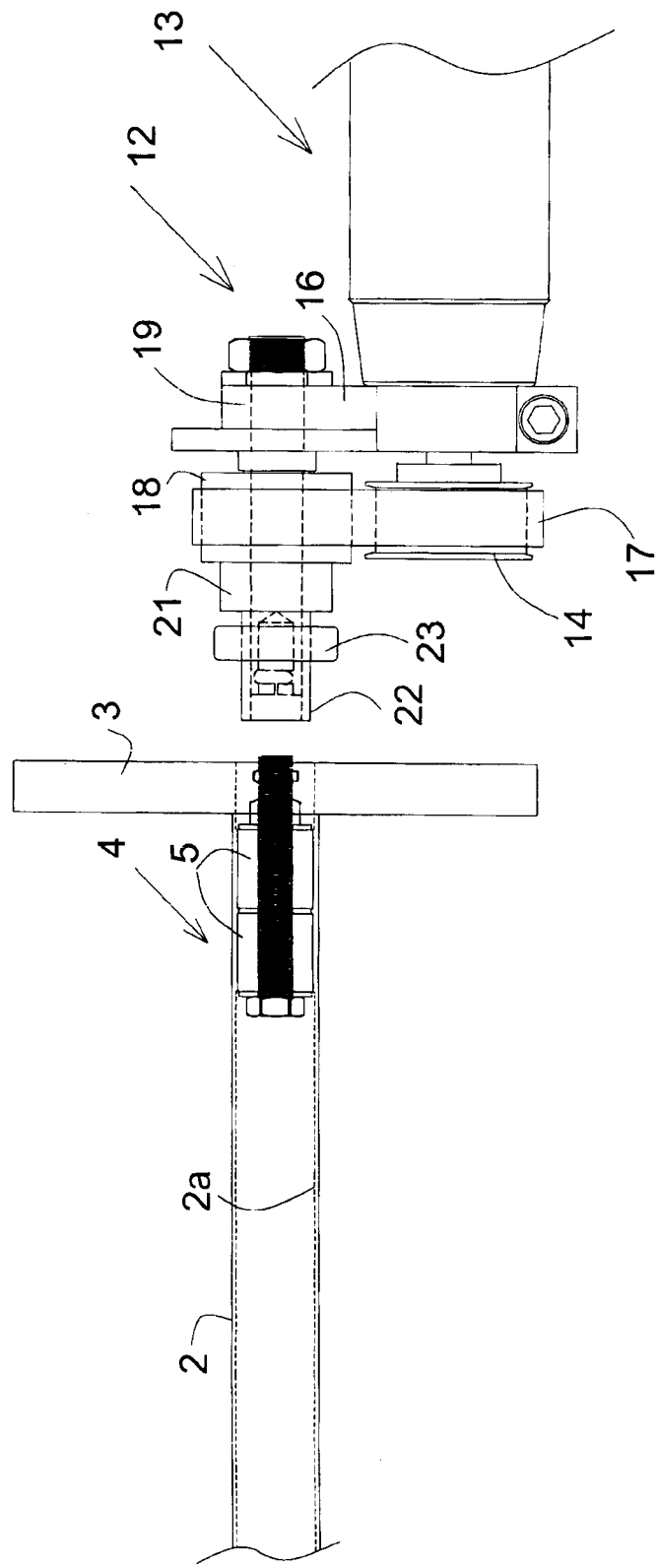
FIG. 10 is a side view of the drive means of the invention disengaged from the plug member of the invention and the plug member installed at the optimum depth in the tube.

FIGS. 8 and 9 show the plug member 4 inserted into a tube 2 of a heat exchanger. FIG. 8 shows the plug means inserted in the tube, but not yet sealed to the inner wall 2a of the tube 2. A clearance 25 is present between the plug member and the inner wall 2a of the tube. Stop 23, whose position is adjustable axially on the outer wall of socket 22, is positioned against the end of the tube to provide the proper depth of the plug member in the tube. A set screw, or the like, can be used to hold stop 23 on socket 22. An operator can easily properly locate the plug member 4 in the tube by inserting the plug member until the stop 23 contacts the end of the tube 2 and/or the tube sheet 3.

FIG. 9 shows plug member 4 in place and sealed to the inner wall 2a of tube 2. The clearance 25 shown in FIG. 8 is not present. The compressible members 5 are in contact with the inner wall 2a and have a force against the inner wall which is provided when nut 8 is advanced along central shaft 6 when the nut is rotated by the drive means 12. The proper amount of force on the inner wall 2a is controlled by controlling the amount of torque provided to nut 8 by drill 13.

Following the installation of plug member 4, drive means 12 can be disengaged from the central shaft by rotating the drive means 12 about central shaft 6 to align pin 11 with the axially extending portions of the slots 20. FIG. 10 shows the plug member 4 installed in tube 2 and the drive means 12 removed from the position used during installation. The drive means is now ready for inserting another plug means in another tube.

As mentioned above, the drive means can also be used for removing a plug member from a tube of a heat exchanger. To remove a plug member from a tube, the plug member 4 is loaded in the drive means 12 in the same manner as discussed above in relation to installing a plug member in a tube. Then, the drill is set to rotate the chuck of the drill in a direction opposite to the direction used for installing the plug member. Since the amount of torque provided to the driver pulley 15 is not a concern for the removing operation, a high torque or non-slip torque setting can be used for the drill.

Figure 11A:
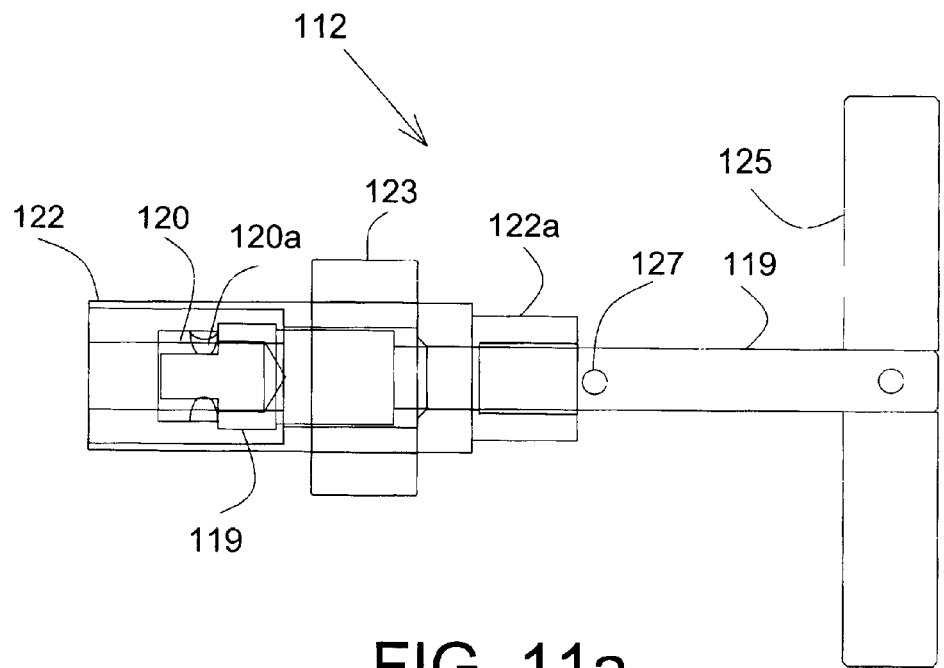
FIGS. 11a and 11b are side views of a manual drive means of the invention.
Figure 11B:
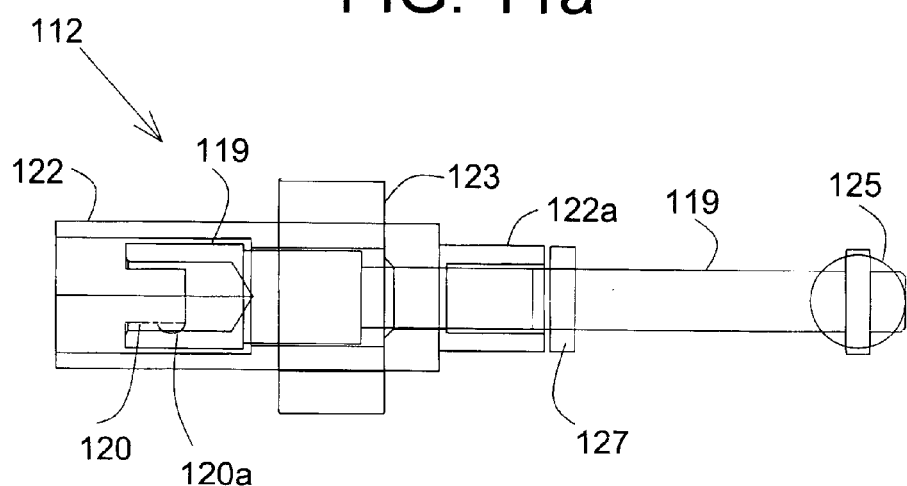

Although it is preferred to use a portable drill, an electric drill or an air driven drill, it is possible to insert a plug member of the invention with use of a manual drive means 112 and a torque wrench. FIGS. 11a and 11b are side views of a manual drive means 112 of the invention.

In FIGS. 11a and 11b the portions for engaging a plug member is similar to that previously described for drive means 12 having an electric drill. That portion includes stationary shaft 119 having vertically extending slots 120 and circumferentially extending slots 120a. The stationary shaft 119 extends in an axial direction and preferably terminates at handle 125. Rotationally connected to stationary shaft 119 is socket 122 having secured to an external surface thereof stop 123. Pin 127, extending through central shaft 106, limits the axial movement of socket 122 on stationary shaft 119, in order to keep the position of the end of stationary shaft 119 relative to the end of socket 122 at the proper spacing to provide the proper engagement with a plug member 4. At portion 122a of socket 122, hexagonal flats are formed for use with a torque wrench in order to be able to apply the correct torque to nut 8 of the plug member.

A plug member is installed into a tube of a heat exchanger by inserting a plug member 4 into the manual drive means 112 in the same manner as shown in FIGS. 6 and 7 and described in the description of FIGS. 6 and 7. As mentioned above, the end portion of the manual drive means 112 is similar to the end portion of drive means 12, and therefore the step of inserting the plug member 4 is the same. Following inserting the plug member 4 into the manual drive means 112 the plug member is inserted into a tube until the stop 123 contacts the end of the tube and/or the tube sheet. Then, handle 125 is held firmly to prevent rotation of the stationary shaft 119 and socket 122 is rotated to advance nut 8 on central shaft 6 of the plug member. Preferably a torque wrench having an open-end drive is used to rotate socket 122, and in turn nut 8, until a proper torque is reached. When the plug member 4 is installed in the tube, the manual drive means is removed by rotating the handle a few degrees counter-clockwise and then pulling the manual drive means away from the plug member.

Figure 12:
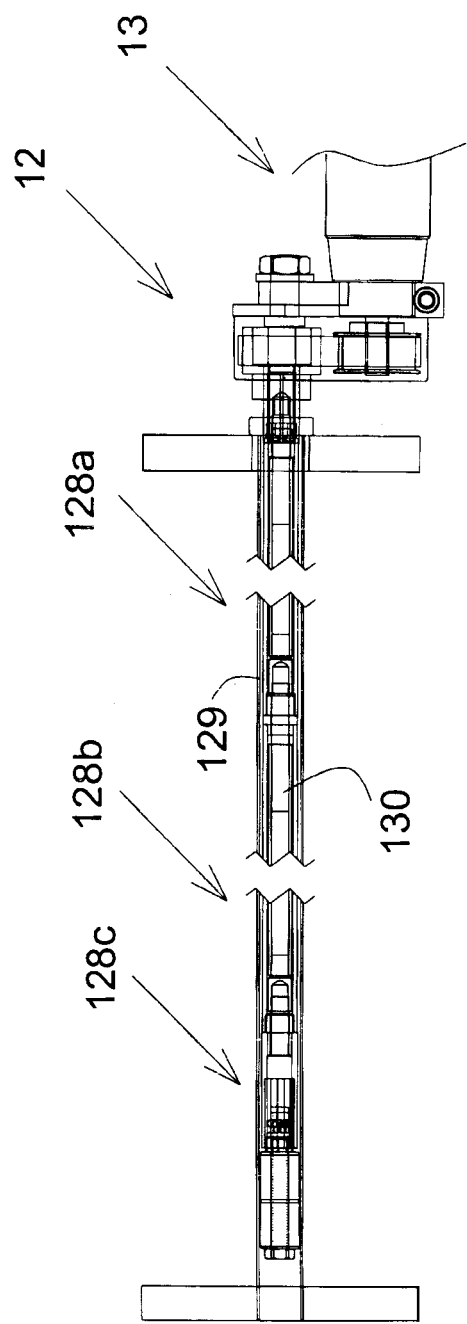
FIG. 12 is a side view of extension members for use with the drive means of the invention.

In some heat exchanger installations access to both ends of the heat exchanger may be difficult. In an installation of this type, it is possible to install a plug member to be located at a distal end of the tube by using the drive means of the invention at a proximal end of the tube. Such an installation can be carried out with use of the drive means 12 shown in FIG. 12 having extension pieces. In the drawing of FIG. 12 the previously described drill 13 and drive means 12 are used along with extension pieces 128a, 128b and 128c. In FIG. 12 three extension pieces are shown, however any number can be used as described below. The extension pieces 128a, 128b and 128c have differing ends, however, they all include an outer shell 129 and an inner shaft 130. The outer shell 129 rotates together with the socket 22 of the drive means 12 in order to rotate the nut 8 of the plug member 4 at the distal end of the tube. The inner shaft 130 is extended from the stationary shaft 19 of the drive means 12 in order to hold the central shaft 6 of the plug member 4 from rotating.

Extension piece 128a is configured at one end to fit into the socket 22 of drive means 12 with use of a hexagonal end on the outer shell 129, and the inner shaft 130 of extension piece 128a is provided with threads to be threaded into left-handed internal threads 131 in the stationary shaft 19, as shown in FIG. 5. At the other end of extension piece 128a left handed threads are provided on both the outer shell and the inner shaft to accept extension piece 128b.

Extension piece 128b has left handed threads on both the outer shell and the inner shaft at both ends, in order to accommodate extension pieces 128a and 128c. The configuration of extension piece 128b is such that any number thereof can be added in order to have an extended length needed to reach the distal end of the tube. In all the extension pieces, the arrangement of internal and external left-handed threads can be selected in order that all the extension pieces accommodate each other in order to arrive at the extended length. On all of the threaded connections it is preferred that the threads bottom out, rather than continue to tighten the two pieces together.

Extension piece 128c, which engages the plug member 4, has at one end left handed threads on both the outer shell and the inner shaft in order to connect to extension piece 128b. At the other end, the extension piece has a socket and stationary shaft having a slot 20, as in stationary shaft 19 shown in FIG. 5, for engagement with a plug member 4.

In use of the drive means and extension pieces, the number of extension pieces 128b needed to reach the distal end of the tube is determined and those extension pieces are connected together along with extension piece 128a and 128c. Then, the assembled extension pieces are attached to the drive means 12 and a plug member is inserted into extension piece 128c in the same manner discussed above for the drive means not using the extension pieces. The stop 23 is then adjusted in order to position the plug member at the desired location in the tube when the plug member and extension pieces are inserted into the tube. After insertion, the nut 8 on plug member 4 is rotated while preventing the central shaft 6 from rotating, thereby expanding the compressible member 5 against the inner wall of the tube to seal the tube at its distal end. The extension pieces are then easily removed by rotating them a few degrees in the counter clockwise direction to disengage the pin 11 from the slot 20 and drawing them out of the tube.

We claim:

1. A system for plugging a heat exchanger tube or the like, comprising:
   a plug member having a radial expanding material for sealing engagement with an inner wall of a tube in which the plug member is inserted,
   a non-rotating member engaged with the radial expanding material, and
   a rotating member engaged with the non-rotating member, wherein
   rotation of the rotating member on the non-rotating member reduces the length of the radial expanding material to radially expand the radial expanding material for sealing engagement with the tribe; and
   a drive means removably engagable with the plug member for installing the plug member in the tube, the drive means providing a rotating movement to the rotating member while preventing rotation of the nonrotating member.

2. The system of claim 1, wherein the drive means includes a stop for controlling the depth the plug member is installed in the tube.

3. The system of claim 1, wherein the drive means includes a driver shaft for connecting to a power device for rotating components of the drive means.

4. The system of claim 1, wherein the drive means includes an adjustable extension means for increasing the depth the plug member is installed in the tube.

5. A system for plugging a heat exchanger tube or the like, comprising:
- a plug member having a central shaft having a compressible member mounted on the central shaft such that axial compression of the compressible member radially expands the compressible member into sealing engagement with an inner wall of a tube in which the plug member is inserted, and
- a drive means removably engaged with the plug member for installing the plug member into the tube and for providing axial force on the compressible member to cause radial expansion of the compressible member into sealing engagement with the inner wail of the tube, wherein
- said drive means includes a means for rotating a rotating member of the plug member and a means for preventing rotation of a non-rotating member of the plug member.

6. The system of claim 5, wherein the central shaft of the plug member has mounted thereon a pressing member abutting the compressible member, and the drive means moves the pressing member axially against the compressible member of the plug member, such that compressive force on the plug member is retained when the drive means is disengaged.

7. The system of claim 6, wherein the central shaft has a threaded portion extending beyond the pressing member and a nut mounted on the threaded portion for removable engagement with the drive means.

8. The system of claim 7, wherein the drive means includes means for preventing rotation of the central shaft and means for rotating the nut.

9. The system of claim 5, wherein the drive means includes a stop for controlling the depth the plug member is installed in the tube.

10. The system of claim 5, wherein the drive means includes a driver shaft for connecting to a power device for rotating components of the drive means.

11. The system of claim 5, wherein the drive means includes an adjustable extension means for increasing the depth the plug member is installed in the tube.

12. A system for plugging a heat exchanger tube or the like, comprising:
- a plug member having a central shaft having a compressible member mounted on the central shaft such that axial compression of the compressible member radially expands the compressible member into sealing engagement with an inner wall of a tube in which the plug member is inserted, and
- a drive means removably engaged with the plug member for installing the plug member into the tube and for providing axial force on the compressible member to cause radial expansion of the compressible member into sealing engagement with the inner wall of the tube, wherein
- the central shaft of the plug member has mounted thereon a pressing member abutting the compressible member, and the drive means moves the pressing member axially against the compressible member of the plug member, such that compressive force on the plug member is retained when the drive means is disengaged, and
- the central shaft has a threaded portion extending beyond the pressing member and a nut mounted on the threaded portion for removable engagement with the drive means, wherein
- said drive means includes a means for rotating a rotating member of the plug member and
- a mean for preventing rotation of a nonrotating member of the plug member.

13. A method for plugging a heat exchanger tube or the like, comprising:
- providing a plug member having a central shaft having a compressible member mounted on the central shaft such that axial compression of the compressible member radially expands the compressible member into sealing engagement with an inner wall of a tube in which the plug member is inserted,
- providing a drive means removably engaged with the plug member for installing the plug member into the tube and for providing axial force on the compressible member to cause radial expansion of the compressible member into sealing engagement with the inner wall of the tube,
- inserting the plug member into the tube to be plugged,
- rotating a driver pulley of the drive means to a selected torque value to provide the axial force on the compressible member, and
- disengaging the drive means from the plug member, wherein
- said drive means includes a means for rotating a rotating member of the plug member and a means for preventing rotation of a non-rotating member of the plug member.

* * * * *